April 19, 1960     E. OFFNER     2,932,892
TREE-PRUNING-DEVICE
Filed June 12, 1957
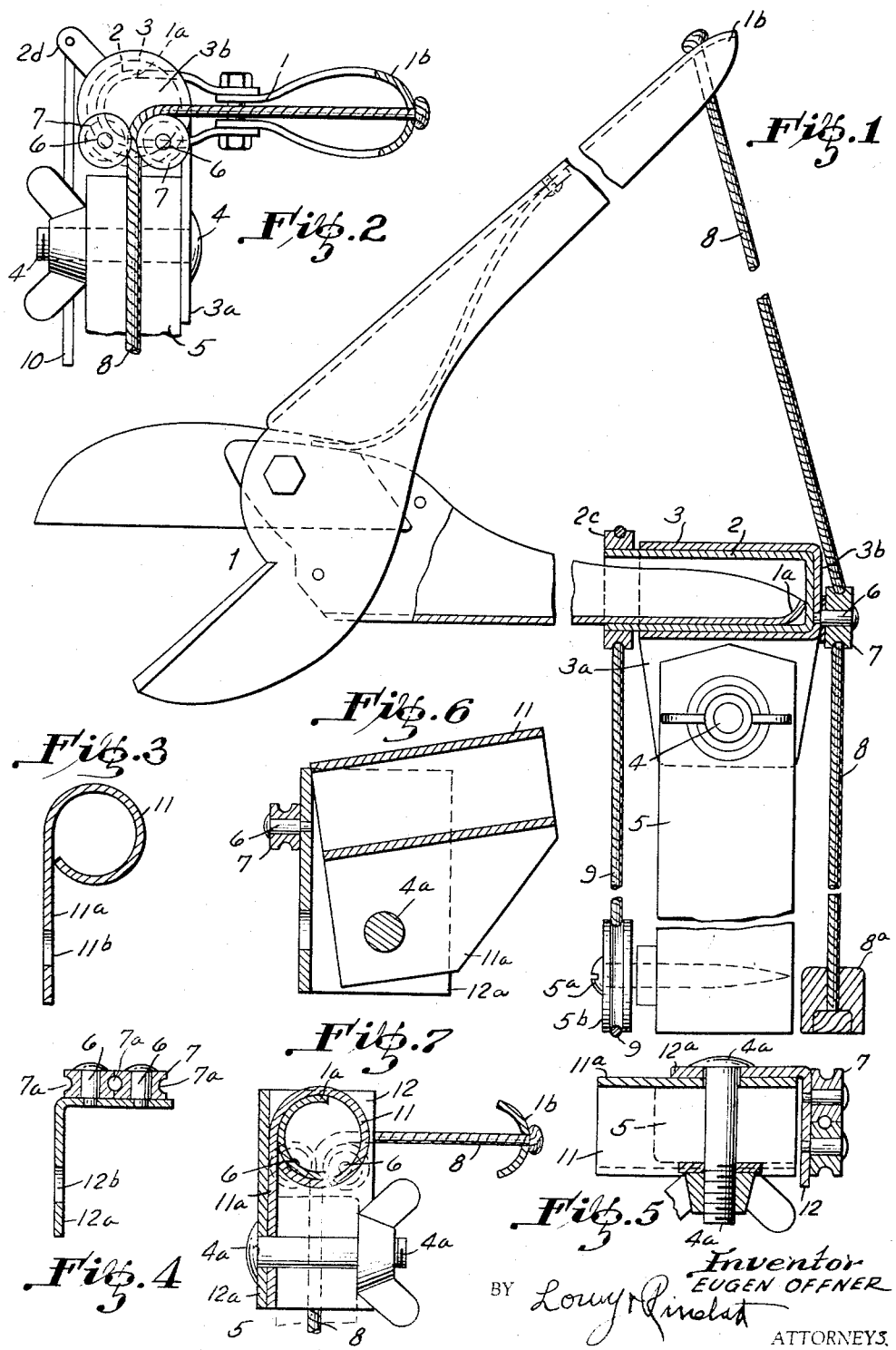
Inventor
EUGEN OFFNER
BY
ATTORNEYS

United States Patent Office 2,932,892
Patented Apr. 19, 1960

2,932,892

TREE-PRUNING-DEVICE

Eugen Offner, Kiel-Hassee, Germany, assignor to Fritz Howaldt Maschinenfabrik, Kiel, Germany, a firm Application June 12, 1957, Serial No. 672,533

5 Claims. (Cl. 30—249)

This invention relates to manually operable tree-pruning shears of cheap and simple construction and which can be generally used for the pruning of all kinds of trees.

Already known to the art are manually operable tree-pruning shears which can be operated only on the top end of a rod and in which the shears are non-adjustably arranged in a casing mounted on the top-end of the rod and adapted for cutting only in longitudinal direction of the rod. In a known construction of this kind one of the parts or blades of the shears is of hook-shaped formation and open in downward direction. It is obvious, therefore, that this part is to be hooked over the branch to be cut off. Which, however, is difficult or frequently impossible because of the many branches which extend in vertical direction. In some other known construction the blades of the shears are open in upward direction, whereby the cutting edges are to be applied from below. And also in this case it is impossible to adjust the cutting edges in vertical direction to vertically extending branches. Hence, an operator carrying one of these known tree-pruning-shears on the top-end of a rod could, when standing on the ground, cut off or remove only the few horizontally—or approximately horizontally extending branches, but not the more numerous vertically—or approximately vertically extending branches, and particularly not the many vertically extending young shoots at the top-end of the trees. When these young shoots are to be removed with pruning-shears of known construction, a ladder is absolutely needed, whereby the rod carrying the shears has then to be supported in substantially horizontal direction.

The object of the present invention is to overcome these disadvantages of known constructions. And the invention solves the problem by employing tree-pruning-shears of simple construction, for example of the known Löwe-tree-pruning type provided with a drawing cutting edge, and by securing one of the handles of the shears in a preferably tubular supporting member extending from the top-end of the supporting rod in substantially vertical direction to the direction of the supporting rod, and adapted for adjustment of its angle of inclination with respect to the direction of the supporting rod in such manner that the shears at the end of the supporting rod can be rotated or adjusted in every cutting direction about two axes extending either vertically to or in inclined direction to each other, and whereby one of these axes may be that of the supporting rod. In order to permit in a construction of this type the closing of the shears from the ground by means of a pull-rope even with the shears extending in a horizontal cutting plane or in a cutting plane vertical to the axis of the supporting rod, the pull-rope is guided from the point where it is fastened to the movable handle of the shears via a guide roller rotatable about the axis of the fastened handle, to the lower end of the supporting rod, whereby the pull-rope—with the shears extending in a vertical cutting plane (see Fig. 1) and with the supporting rod likewise extending in vertical direction—is guided to the ground in a direction declining only slightly from the vertcal direction. On the other hand, when the shears extend in a horizontal direction or cutting plane, the pull-rope is first guided to the guide roller in horizontal direction (see Figs. 2 and 7) and from there in vertical direction or approximately vertical direction down the supporting rod to the ground. When the device is so arranged that the shears extend from an approximately vertically supported rod at an inclination of approximately 30 degrees with respect to the horizontal plane, it is possible and proved by many tests that about 80% of all branches can be cut off without any additional adjustment of the position of the shears merely through simple turning of the supporting rod about its own axis, as the inclining plane of the shears with respect to the supporting rod then follows the trend of a screw plane along which it is possible to obtain for practically every branch the proper vertical cutting position. In the much smaller number of difficult branch positions a simple manual adjustment of the angle of inclination of the plane of the shears through rotational adjustment of the shears in their tubular support, or through adjustment of the tubular support with respect to the supporting rod, will fully suffice to overcome the difficulty. In the cheap and simple construction of Figs. 3, 4, 5, 6, 7 the rotational adjustment of the shears in the tubular support has to be effected by hand. In the somewhat more expensive construction of Figs. 1 and 2 the tubular support may itself be rotatably positioned in additional supporting means in such manner that the rotatable tubular support can be rotated according to requirements from the lower end of the supporting rod either with the aid of a pull-rope or a rod-mechanism.

The device of the invention has the further advantage that it is suited for use of known shears, such as the "Löwe-tree-pruning-shears" and that no shears of special construction are needed, that is to say, that one type of shears can be employed either manually or inserted into the aforesaid tubular support and be used together with any kind of supporting rod of suitable length for all tree-pruning purposes. This is an advantage which never before has been attained.

Additional features and advantages of the invention will be understood from a consideration of the following detailed description taken in consideration with the accompanying drawings forming a part of this specification and in which several embodiments of the invention have been shown by way of example. However, I wish to say that the invention is not confined to any strict conformity with the showing of the drawings but may be changed or modified, so long as such changes or modifications mark no material departure from the salient features of the invention as expressed in the appending claims.

In the drawings, in which like parts are referred to by the same reference numerals, Fig. 1 is a side elevation, partly in section, of tree-pruning shears provided with means for the adjustment of the position of the shears from the lower end of the supporting rod of the shears, whereby the shears have been rotated into a cutting plane extending in vertical direction to the axis of the supporting rod, in which position, however, the shears can produce good results only when horizontally extending branches have to be cut;

Fig. 2 is a rear view of tree-pruning-shears adapted for adjustment from the lower end of the supporting rod, whereby the shears have to be rotated into a plane extending vertically to the direction of the supporting rod, which position is particularly suited for the cutting of vertically extending branches; it will be seeen that the pull-rope or cutting rope is here deflected by the guide rollers at a right angle;

Figs. 3 and 4 are sectional detail views of parts of a simplified form of construction provided with supporting means for the shears in which the shears have to be manually rotated for their adjustment;

Fig. 5 is a sectional view of these simplified supporting means for the shears seen from the lower end of the supporting rod;

Fig. 6 is a sectional side elevation of these simplified supporting means for the shears;

Fig. 7 is another sectional side elevation of these simplified supporting means for the shears, showing in section also the handles of the shears.

In the form of construction illustrated in Figs. 1 and 2 one of the handles of the tree-pruning-shears 1 is inserted into a cylindrical casing (or inwardly slightly conical casing) 2 which in its turn is rotatably seated in a supporting casing 3. The supporting casing 3 is provided with the fastening flaps 3a securing the casing adjustably with the aid of a screw and winged nut 4a to the upper end of the supporting rod 5. Rotatably mounted on the end 3b of the supporting casing 3 on a pin 6, or preferably on two pins 6 arranged side by side, are the guide rollers 7 provided with circumferential grooves 7a in which the cutting rope 8, extending from the outer end of the rotatable handle 1b, is guided, so that the shears can be closed for the cutting of tree branches through pulling at the lower end of the rope or at the handle 8a, that is to say, through pulling from the lower end of the supporting rod 5. For the rotation of the cutting edge of the shears, that is to say, for the adjustment of the angle of inclination of the cutting edge with respect to the supporting rod, the open end portion of the casing 2, in which the handle 1a of the shears is supported, is provided with an annular projection 2c (see Fig. 1) and with an annular groove in said annular projection, or with a turning lever 2d (see Fig. 2), by means of which the casing 2 and the shears 1 supported in it can be rotated from the lower end of the supporting rod 5 either with the aid of a rope 9 and a roll 5b mounted on a bolt 5a (see Fig. 1), or with the aid of rods 10 (see Fig. 2).

In the cheap and simple form of construction illustrated in Figs. 3, 4, 5, 6, 7 the tree-pruning-shears are supported in the guide casing 11, which in simplest manner is produced with its fastening flap 11a and fastening hole 11b from a piece of band iron (see Fig. 3) and in which the shears 1, 1a, 1b must be rotated by hand for the adjustment of the angle of inclination (see Fig. 7). In the simple form of construction of Fig. 4 the pins 6 of the guide rollers 7 are secured to a flange 12 of an angle iron, produced likewise from a piece of band iron while the other flange 12a of the angle iron is provided with a fastening hole 12b for the joint fastening of the two parts 11 and 12 to the upper end of the supporting rod 5 by means of the screw and winged nut 4a, whereby the screw 4a extends through the holes 11b and 12b and through a transverse hole in the upper end of the supporting rod 5.

It is possible to produce at low cost in one piece similarly devised supporting means for the shears through casting, annealed cast-iron, or through die-casting, in case of large orders, whereby, however, considerable expenses for tools are incurred.

Production at low cost is possible through die-casting in artificial material. But in this case the outlay for tools is more considerable still, so that only largest orders will pay the expenses.

What I claim as new and desire to secure by Letters Patent of the United States is:

1. A novel type of tree-pruning-device, comprising in combination with tree-pruning-shears of known construction and with a supporting rod for the shears of suitable length, tubular supporting means adapted to snugly and rotatably embrace a handle of the shears inserted into it in such fashion that the shears are rotatable at the supporting rod within said tubular supporting means substantially about the axis of the handle inserted into the tubular supporting means; fastening means rigidly secured to said tubular supporting means and adapted to tightly and adjustably secure said tubular supporting means to the top-end of said supporting rod in such fashion that the angle of inclination of said tubular supporting means with respect to the axis of said supporting rod can be adjusted according to requirements so that the twofold adjusting possibility of the shears in the tubular supporting means as well as at the top-end of the rod permits the correct adjustment of the shears in practically vertical cutting-position to every tree-branch axis; circumferentially grooved roller means rotatably mounted at the end of said tubular supporting means in approximately the axis of the handle embraced by the tubular means opposite the end into which said handle of the shears is inserted; and a pull-rope having one end secured to the free end of the free handle of the shears and guided via said roller means to the lower end of said rod, so that pulling at the lower end of said rope results in closing of said shears.

2. A novel type of tree-pruning-device, comprising in combination with tree-pruning-shears of known construction and with a supporting rod for the shears of suitable length, a tubular supporting member closed at one end and provided with fastening means rigidly secured to it and adapted to tightly and adjustably secure said tubular member to the top-end of said supporting rod in such fashion that the angle of inclination of said tubular member with respect to the axis of said supporting rod can be adjusted according to requirements; a second tubular supporting member snugly and rotatably fitted into said tubular supporting member first occurrence in such fashion that an open end of said second tubular member somewhat projects from the first tubular member, said second tubular member being adapted to tightly embrace a handle of said shears inserted into it; circumferentially grooved roller means rotatably mounted at the end of said first tubular member opposite the end into which said second tubular member is fitted and in approximately the axis of the handle of the shears inserted into the second tubular member; and a pull-rope having one end secured to the free end of the free handle of the shears and guided via said roller means to the lower end of said rod, so that pulling at the lower end of said rope results in closing of said shears.

3. A tree-pruning-device as specified in claim 2, including rotating means for said second tubular member rigidly secured to the projecting open end of said second tubular member; and means secured to said rotating means and adapted to permit rotation of said rotating means from the lower end of said supporting rod.

4. A tree-pruning-device as specified in claim 2, including rotating means for said second tubular member, said rotating means consisting of a circumferentially grooved collar rigidly mounted on the projecting open end of said second tubular member; and of a pull-rope embracing said grooved collar and reaching down to the lower end of said supporting rod and permitting operation by the operator of the device from the lower end of the supporting rod.

5. A tree-pruning-device as specified in claim 2, including rotating means for said second tubular member, said rotating means consisting of a lever-arm rigidly secured to said projecting open end of said second tubular member; and of a rod-mechanism secured to said lever-arm and reaching down to the lower end of said supporting rod and permitting operation by the operator of the device from the lower end of the supporting rod.

References Cited in the file of this patent

UNITED STATES PATENTS 736,763   Mohr _____ Aug. 18, 1903

FOREIGN PATENTS 23,847   Germany _____ Mar. 22, 1956